United States Patent
Higuchi et al.

(10) Patent No.: US 7,157,520 B2
(45) Date of Patent: Jan. 2, 2007

(54) PROCESS FOR PRODUCING POWDERY LINEAR POLYMER HAVING IMPROVED POWDER PROPERTIES

(75) Inventors: Atsuhiro Higuchi, Fukushima (JP); Yasuhiro Suzuki, Fukushima (JP)

(73) Assignee: Rohm and Haas Company, Philadelphia, PA (US)

( * ) Notice: Subject to any disclaimer, the term of this patent is extended or adjusted under 35 U.S.C. 154(b) by 50 days.

(21) Appl. No.: 10/493,935

(22) PCT Filed: Aug. 28, 2002

(86) PCT No.: PCT/JP02/08653

§ 371 (c)(1),
(2), (4) Date: Oct. 4, 2004

(87) PCT Pub. No.: WO03/029305

PCT Pub. Date: Apr. 10, 2003

(65) Prior Publication Data

US 2005/0049332 A1    Mar. 3, 2005

(30) Foreign Application Priority Data

Sep. 28, 2001 (JP) .............................. 2001-300028

(51) Int. Cl.
  *B32B 5/16* (2006.01)
  *C08L 31/02* (2006.01)
(52) U.S. Cl. ........................... 525/80; 525/71; 525/85; 525/86; 525/902; 428/407
(58) Field of Classification Search .................. 525/71, 525/80, 85, 86; 428/407
See application file for complete search history.

(56) References Cited

U.S. PATENT DOCUMENTS

| | | | |
|---|---|---|---|
| 3,896,093 A | 7/1975 | Valoti | |
| 4,053,546 A * | 10/1977 | Yamasaki et al. | 264/49 |
| 4,897,462 A | 1/1990 | Yusa | |
| 5,112,910 A * | 5/1992 | Piejko et al. | 525/84 |
| 5,985,993 A | 11/1999 | Lee | |
| 6,388,043 B1 * | 5/2002 | Langer et al. | 528/80 |
| 6,682,809 B1 * | 1/2004 | Van Rheenen | 428/220 |
| 6,706,399 B1 * | 3/2004 | George et al. | 428/407 |

FOREIGN PATENT DOCUMENTS

| | | |
|---|---|---|
| EP | 467288 | 1/1992 |
| EP | 722961 | 7/1996 |
| EP | 0727444 | 8/1996 |
| GB | 1357797 | 6/1974 |
| JP | 49-120945 | 11/1974 |
| JP | 59-72230 | 4/1984 |
| JP | 59-91103 | 5/1984 |
| JP | 60-217224 | 10/1985 |
| JP | 50-9653 | 1/1993 |
| JP | 5037699 | 2/1993 |
| JP | 5-163320 | 6/1993 |
| JP | 6-24009 | 4/1994 |
| JP | 10-17626 | 1/1998 |
| JP | 11322860 | 11/1999 |
| JP | 2000-119476 | 4/2000 |

* cited by examiner

*Primary Examiner*—H. Thi Le
(74) *Attorney, Agent, or Firm*—Marcella Bodner

(57) ABSTRACT

A powdery linear polymer having a narrow particle size distribution with little dusting and excellent in anti-blocking property is recovered from a latex of a linear polymer containing a large proportion (35–75 wt. %) of soft polymer (S) component through a two-step coagulation process including a first (moderate coagulation) step causing 70–98 wt. % of the coagulation. The linear polymer in the latex has a multilayer structure comprising a linear polymer (S) having a glass transition temperature below 40° C. and a linear polymer (H) having a higher glass transition temperature disposed in totally at least two layers and containing 35–75 wt. %, as a whole, of the linear polymer (S) with the proviso that the linear polymer (S) cannot be contained in excess of 30 wt. % in an outermost layer of the multilayer structure.

11 Claims, No Drawings

PROCESS FOR PRODUCING POWDERY LINEAR POLYMER HAVING IMPROVED POWDER PROPERTIES

CROSS REFERENCES TO RELATED PATENT APPLICATIONS

This non-provisional application is a national stage of International Patent Application No. PCT/JP02/08653, filed Aug. 28, 2002, benefit of which is claimed under 35 U.S.C. § 365(c) and which in turn claims benefit under 35 U.S.C. § 120 Japanese Laid-Open No. 2001-300028, filed Sep. 28, 2001, priority benefit of which is also claimed for the present national stage application.

TECHNICAL FIELD

The present invention relates to a process for recovering a powdery linear polymer having a narrow particle size distribution and an excellent anti-blocking property from a latex of a linear polymer.

BACKGROUND ART

A polymeric molding material is subjected to molding by itself or after mixing with another additive. For example, in the case of a vinyl chloride resin, it is well known that the vinyl chloride resin is subjected to molding after powdery mixing with a polymeric modifier, such as an impact modifier comprising a rubber-based graft copolymer, a fusion promoter-type processing aid comprising, e.g., an acrylic resin having a relatively high glass transition temperature (Tg), or a lubricant-type processing aid comprising, e.g., an acrylic resin having a relatively low Tg. Such a polymeric modifier is recovered in a powder form from a latex of the polymer, and for its use as a molding material or for the powdery mixing thereof prior thereto, should desirably have good powder properties as represented by a narrow particle size distribution, and excellent flowability and anti-blocking property. However, such desires have not been necessarily met so far.

For example, regarding the lubricant-type polymeric processing aid, multilayer polymer structures comprising a low-Tg polymer and a high-Tg polymer and containing a relatively large proportion of the low-Tg polymer, have been proposed (JP-B 50-37699, JP-A 49-120945, JP-A 50-9653), but the powder properties thereof have not been satisfactorily improved.

More specifically, as for methods of obtaining powdery or particulate products from polymer latexes, there have been used a method of mixing a polymer latex with an electrolyte aqueous solution under stirring to coagulate the resin content, a method of spraying a polymer latex into a hot gas stream to dry the polymer latex, etc.

However, the powdery products obtained through the above methods contain a large amount of fine powder fraction, so that they are accompanied with many problems in handling, such as poor filterability or dewaterbility, and dusting after drying (i.e., scattering of dust during operations, such as transportation, metering and loading of powdery products) resulting in poor operation environments.

In contrast thereto, several methods including two-step coagulation of polymer latexes for recovering powdery or particulate products having good powder properties from such polymer latexes, have been proposed (JP-A 59-91103, JP-A 60-217224, JP-A 6-24009, etc.). These methods are understood as having succeeded to some extent in recovery of powdery polymers having improved powder properties from crosslinked rubber-based latexes, but it is difficult to regard that these methods have succeeded as methods for recovering linear polymer powders. In contrast thereto, our research and development group has succeeded in recovering a powdery polymer having good powder properties from a latex of an acrylic linear polymer having a relatively high glass transition temperature (JP-A 10-017626) but has not succeeded in recovering a powdery polymer having good powder properties from a latex of a linear polymer containing 30 wt. % or more of polymer component having a glass transition temperature below 40° C.

DISCLOSURE OF INVENTION

In view of the above-mentioned circumstances, a principal object of the present invention is to recover a powdery polymer which has a sharp particle size distribution with little fine or coarse powder fraction, is little liable to cause dusting and also is excellent in anti-blocking property, from a latex of a linear polymer containing a large proportion of soft polymer component having a low glass transition temperature.

Thus, according to the present invention, there is provided a process for producing a powdery linear polymer, comprising:

a step of forming a latex (A) of a multilayer polymer having a multilayer structure comprising a linear polymer (S) having a glass transition temperature below 40° C. and a linear polymer (H) having a higher glass transition temperature disposed in totally at least two layers and containing 35–75 wt. %, as a whole, of the linear polymer (S) with the proviso that the linear polymer (S) cannot be contained in excess of 30 wt. % in an outermost layer of the multilayer structure, a moderate coagulation step of adding a coagulant to the latex (A) to coagulate 70–98 wt. % of the multilayer polymer, and a further coagulation step of further adding a coagulant to the latex to complete the coagulation of the multilayer polymer.

Some history as to how we have arrived at the present invention as a result of our study for achieving the above object, will now be briefly supplemented.

After our success in recovery of a powdery polymer having good powder properties through a two-step coagulation process including a moderate coagulation step of a rubber-based graft copolymer latex (as reported in JP-A 59-72230), we have had a recognition that coagulated particle formation under the moderate coagulation conditions proceeds on a delicate balance between a heating temperature and softening of polymer particles. More specifically, as a result of heating during the coagulation, the melt-sticking of latex particles proceeds to form spherical enlarged coagulated polymer particles. During the step, however, the polymer is in a softened state, so that the formation of further enlarged coarse particles and/or blocking are liable to occur easily subsequently. Such a difficulty can be alleviated by the presence of a crosslinked trunk polymer having an anti-heat-softening property in the graft copolymer. In the case of a latex containing uniformly structured particles of a linear polymer, however, when the system is heated in such a degree as required for providing a certain level of particle size, the entire polymer is liable to be softened by the heat to easily cause the formation of coarsely large particles and/or the blocking. For obviating such difficulties, it is consequently impossible to provide sufficient temperatures for the moderate coagulation and subsequent heat treatment, thus resulting in particles which have a low bulk density and are liable to be broken to finally provide a fine particulate product containing much fine powder fraction.

As a result of further study based on the above knowledge, we succeeded in two-step coagulation treatment including moderate coagulation of a linear polymer latex by using a multilayer structure including a high-Tg polymer coated with a low-Tg polymer instead of the graft copolymer so as to charge the high-Tg polymer with the role of the rubber trunk polymer of the graft copolymer (JP-A 10-17626). The multilayer structure adopted in the above is represented as an H/S structure in a sequence from the inside to the outside if the low-Tg (soft) polymer is represented by "S" and the high-Tg (rigid or hard) polymer is represented by "H". In the multilayer structure, however, if the outside low-Tg polymer (S) is used in excess of 30 wt. %, the particles formed by coagulation at the moderate coagulation temperature is liable to further melt-stick to each other, thus causing the formation of coarsely large particles and/or the blocking. Accordingly, at that time, we had to give up further increasing the low-Tg polymer (S).

As a result of further study, however, it has been gradually clarified that the melt-stickability-imparting effect of the linear polymer (S) in the H/S linear polymer structure can be attained not only in the H/S structure but also in the S/H structure. More specifically, we assumed that the linear polymer (S) functioning as a glue in the moderate coagulation effectively operated only when it was in the outside, but it has been found that the linear polymer (S) can effectively operate even when it is in the inside. After all, it is understood that a heterogeneous joining state of S/H or H/S instead of a uniform mixture structure of a linear polymer, i.e., a multilayered state retaining the respective properties of the polymer (S) and the polymer (H), effectively functions for providing a harmony between the promotion of adhesion between adjacent particles and the prevention of blocking. Incidentally, there is a further possibility that a structure retaining gradients of the respective properties from S to H or H to S at the boundary or joint between S and H provides an effective function, while this has not been clarified as yet. As a result of further study, it has been found possible to proceed with smooth moderate coagulation while preventing the excessive coagulation such as the blocking, if the polymer (S) is not excessively localized at the surface, that is, if the amount of the polymer (S) in the outermost layer of the multilayer polymer is suppressed to be at most 30 wt. % of the total polymer (i.e., a part of the polymer (S) is disposed in an inner layer). Consequently, we have had a knowledge that if the above condition is satisfied, it is possible to incorporate 35 wt. % or more of the polymer (S), and have arrived at the present invention.

DESCRIPTION OF PREFERRED EMBODIMENTS

The multilayer polymer constituting the latex (A) subjected to moderate coagulation or partial coagulation is a multilayered polymer comprising at least one layer of linear polymer (S) having a glass transition temperature (Tg) below 40° C. (hereinafter also called a "soft polymer" or "polymer (S)"), and at least one layer of linear polymer (H) having a higher Tg (hereinafter also called a "hard polymer" or "polymer (H)"). Herein, the term "linear polymer" is used in a sense of being differentiated from a crosslinked polymer.

Of 100 wt. parts of linear polymer constituting the multilayer polymer, polymer component(s) having a glass transition temperature below 40° C. and therefore classified under a term "polymer (S)" are contained totally in an amount of 35–75 wt. parts. If the content is below 35 wt. parts, the multilayer polymer is free from the problem in anti-blocking property to be solved by the present invention. In excess of 75 wt. parts, it becomes difficult to obtain a powdery polymer having an essentially good anti-blocking property.

In other words, a hard polymer (component) is necessary in order to provide an appropriate degree of hardness to the multilayer polymer in the latex or the powder product thereof, thereby reducing the adhesion and precipitation during the polymerization and coagulation and providing the powder product with an improved anti-blocking property. For this purpose, the hard polymer is required to be present in an amount of at least 25 wt. parts in the multilayer polymer in the present invention, and if this is not satisfied, it becomes difficult to impart a sufficient rigidity at a temperature around room temperature where such a powdery product is handled, thus resulting in a powdery product having only an inferior anti-blocking property.

Next, the structure of the multilayer polymer contained in the latex (A) will be described.

The number of layers in the multilayer polymer is not particularly limited, but a two-layer or a three-layer structure is preferred in view of the complexity of production and the length or number of steps for production of multilayer polymers having a larger number of layers. In either case of the two-layer or three-layer structure, it is preferred to provide a multilayer structure, including an outermost layer comprising a linear polymer having a glass transition temperature of at least 40° C. or a linear polymer having a glass transition temperature below 40° C. in an amount of 0–30 wt. parts per 100 wt. parts of the multilayer polymer.

The latex of the multilayer polymer subjected to moderate coagulation according to the present invention may preferably be produced through either one of the following two process embodiments.

(First Embodiment)

The multilayer polymer latex (A) is produced through a process including the steps of:

(a) in the presence of 0–60 wt. parts of a linear polymer (H1) having a glass transition temperature of at least 40° C., polymerizing a monomer mixture which, when polymerized alone, provides a glass transition temperature below 40° C., to form 35–75 wt. parts of a linear polymer (S), and (b) in the presence of the polymers (H1) and (S), further polymerizing a monomer mixture which, when polymerized alone, provides a glass transition temperature of at least 40° C., to form 5–65 wt. parts of a linear polymer (H2) so as to proved 100 wt. parts in total of (H1)+(S)+(H2).

(Second Embodiment)

The multilayer polymer latex (A) is produced through a process including the steps of:

(a) in the presence of 5–75 wt. parts of a linear polymer (S1) having a glass transition temperature below 40° C., polymerizing a monomer mixture which, when polymerized alone, provides a glass transition temperature of at least 40° C., to form 25–65 wt. parts of a linear polymer (H), and (b) in the presence of the polymers (S1) and (H), further polymerizing a monomer mixture which, when polymerized alone, provides a glass transition temperature below 40° C., to form 0–30 wt. parts of a linear polymer (S2) so as to provide 100 wt. parts in total of (S1)+(H)+(S2).

The above-described two embodiments are not quite different from each other but are based on a common concept that the two polymers (S) and (H) form a layer structure while retaining their own properties in proximity to the surface of the multilayer polymer particles in the latex.

The soft polymer (S) (or (S1) and (S2), as the case may be), is characterized by a glass transition temperature Tg below 40° C. but may preferably have a Tg in the range of −80° C. to 35° C. The hard polymer (H) (or (H1) and (H2), as the case may be), is characterized by a glass transition temperature Tg higher than that of the soft polymer S, preferably by a Tg of at least 40° C. It is further preferred that the hard polymer (H) has a Tg higher by at least 30° C., more preferably at least 40° C., than that of the soft polymer (S), and particularly preferably has a Tg in the range of 40–110° C.

The amount and the layer disposition of the soft polymer layer(s) and the hard polymer layer(s) in the multilayer polymer may affect the temperatures for particle formation (inclusive of coagulation) and the bulk density of the resultant particles, but may generally be determined in consideration of operability in the moderate coagulation and the anti-blocking property of the resultant powdery product.

More specifically, in order to smoothly proceed with the moderate coagulation and ensure the anti-blocking property of the resultant powder by hardening to some extent the surface and vicinity thereof of the multilayer polymer particles, it is necessary that the hard polymer is disposed as the outermost layer, or in the case where the soft polymer is disposed as the outermost layer, a portion thereof in an amount of at most 30 wt. % of the total polymer is used to form the outermost layer and the remaining portion in excess of the 30 wt. % is distributed to an inner layer of the multilayer polymer constituting the latex.

Thus, by defining the layer structure of the multilayer polymer in the above-described manner, it becomes possible to provide a good balance between the anti-blocking property and the moderate coagulation operability inclusive of an appropriate moderate coagulation temperature even for a latex polymer containing a relatively large proportion of soft polymer.

The linear polymers forming the respective layers of the multilayer polymer may comprise either homopolymers or copolymers. Any monomers providing linear polymers may be used without a particular restriction, and examples thereof may include: methacrylate esters, acrylate esters; styrenic monomers, such as styrene, α-methylstyrene and vinyltoluene; and vinyl cyanides, such as acrylonitrile and methacrylonitrile. Particular monomers to be used may be appropriately selected depending on the usage or function of the resultant powdery polymer product.

Also the molecular weights of the respective polymer components are not particularly restricted and may be adjusted depending on the usage of the resultant polymer product by changing the species and amount of chain transfer agents and initiators, the polymerization temperature, the manner of addition of monomer or monomer-containing solution, etc. As the chain transfer agent, alkyl mercaptans having 4 to 12 carbon atoms, such as n-octylmercaptan and n-dodecylmercaptan, may be frequently used, but these are not restrictive.

The powdery polymer having the resin structure specified by the present invention may for example be used as various processing aids for thermoplastic resins. For examples, if the component soft and hard copolymers are formed as copolymers having compositions as described below, it is possible to obtain a lubricant-type processing aid wherein the relatively soft (S) polymer component functions as a lubricating component. This is however just an example and should not be construed as restricting the usage of the powdery polymer obtained by the present invention.

The linear polymer (S) having a glass transition temperature (Tg) below 40° C. is a (co)polymer having a weight-average molecular weight of at most 100,000, preferably at most 50,000, obtained by polymerizing a monomer (mixture) comprising 25–100 wt. % of at least one species of monomer selected from alkyl acrylates having an alkyl group of 1–18 carbon atoms, and 0–75 wt. % of at least one species of monomer selected from other vinyl monomers copolymerizable with an alkyl acrylate; and the linear polymer (H) having a glass transition temperature (Tg) of at least 40° C. is a (co)polymer having a weight-average molecular weight of at least 100,000, preferably at least 300,000, obtained by polymerizing a monomer mixture comprising 35–100 wt. % of at least one species of monomer selected from methacrylate esters, acrylate esters and styrene monomers, and 0–65 wt. % of at least one species of monomer selected from other vinyl monomers copolymerizable therewith. This is a preferred embodiment of combination.

Incidentally, in the present specification (including Examples and Comparative Examples), the glass transition temperatures Tg of (co)polymers forming the respective layers of multilayer polymers are based on values determined based on monomer compositions according to the following formula (Fox's formula, e.g., as disclosed in "Plastic Polymer Science and Technology" by M. D. Baijal, John Wiley & Sons; p. 205 (1982)).

$1/Tg = W1/Tg1 + W2/Tg2 + W3/Tg3 + \ldots$, wherein W1, W2, W3, . . . represent weight fractions of monomer components 1, 2, 3, . . . , respectively, with the proviso that $W1+W2+W3+ \ldots = 1.0$; and Tg1, Tg2, Tg3, . . . represent glass transition temperatures [K] of homopolymers of monomer components 1, 2, 3, . . . , respectively. Some examples of homopolymer Tg values are enumerated below with respect to representative monomers:

methyl methacrylate (MMA), Tg=105° C.=378 K,
butyl methacrylate (BMA), Tg=20° C.=293 K,
butyl acrylate (BA), Tg=−54° C.=219 K,
styrene (ST), Tg=105° C.=378 K,
acrylonitrile (AN), Tg=97° C.=370 K.

As for the polymerization process for providing the latex (A) of multilayer polymer used in the present invention, it is preferred to employ ordinary emulsion polymerization using water as the dispersion medium. As the emulsifier, it is possible to use known anionic surfactants and nonionic surfactants alone or in combination. As the polymerization initiator, ordinary water-soluble or oil-soluble initiators may be used singly or so as to form a redox catalyst system. The monomer (mixture) may be added alone or in an emulsified state into the reaction vessel.

The polymerization may be performed according to either a batch-wise polymerization mode or a continuous polymerization mode. The polymerization for forming each layer can also be performed by step-wise addition of monomers, so as to prevent the polymer adhesion onto the reaction vessel wall or suppress the polymerization heat, and the composition of monomer mixture added at each time can be different. The polymerization process for obtaining such a multilayer polymer latex is well known as the grow-out emulsion polymerization method and can be easily practiced by one of ordinary skill in the art by appropriate adjustment of an emulsifier, an initiator, a monomer addition-mode, etc.

The latex particle size of the multilayer polymer is not particularly restricted. However, too small a latex particle size results in too high a latex viscosity which makes the handling difficult and requires a lower resin concentration leading to a lower production efficiency. On the other hand, too large a latex particle size results in a slower reaction and a larger amount of residual monomer. Accordingly, a latex particle size in a range of 50–1000 nm, more preferably 50–500 nm, is preferred.

Another example of such a process for producing a polymer latex to be processed according to the present invention is disclosed in JP-B 50-37699.

As described above, it is important for achieving the object of the present invention that the multilayer polymer in the latex (A) has the above-mentioned specific layer structure, and it is possible to obtain a powdery copolymer having a narrow particle size distribution and an excellent antiblocking property only when such a multilayer polymer latex (A) is subjected to a coagulation process as described below.

A multilayer polymer latex (ordinarily having a polymer concentration on the order of 20–60 wt. %) produced through a process as described above and an aqueous coagulant solution at a low concentration are mixed under an appropriate degree of stirring. As a result, with lapse of time, spherical particles are gradually grown, and the viscosity in the coagulation system is increased. The state of increased viscosity of the coagulation system continues for a while, and as a majority of the latex polymer is converted into spherical particles, the viscosity of the coagulation system is lowered to provide a so-called particulate slurry. In order to result in such a particulate slurry, it is indispensable to provide a moderate coagulation state showing a moderate coagulation speed when the multilayer polymer latex and the coagulant aqueous solution are mixed. The amount of the coagulant for providing the moderate coagulation state can vary depending on the composition of the multilayer polymer latex, the species of emulsifier and initiator used in the polymerization, the amount of electrolyte in the latex, etc., but may be determined by measuring the amount of polymer coagulated in the first coagulation step (i.e., moderate or partial coagulation step).

The condition for the first moderate coagulation step should be set so as to coagulate 70–98 wt. % of the latex polymer. The coagulated polymer percentage can be confirmed by filtrating the slurry after the moderate coagulation through a third-class filter paper according to JIS P3801 (e.g., "No. 131", made by Toyo Roshi K. K.) and weighing the polymer on the filter paper.

If the coagulated polymer percentage after the moderate coagulation is below 70 wt. %, a large amount of yet-uncoagulated latex polymer is abruptly coagulated in a subsequent complete coagulation step, whereby the resultant particulate product is caused to have non-uniform particle shapes and is accompanied with a large amount of fine powder fraction. On the other hand, a condition giving a coagulated polymer percentage exceeding 98 wt. % is too strong a coagulation condition and results in non-uniform particle sizes giving a broad particle size distribution.

The coagulant used in the coagulation steps in the process of the present invention may comprise an organic acid, an inorganic acid, an inorganic salt or an organic salt. In order to prepare a coagulant solution, these coagulants may respectively be used in a single species or a combination of two or more species.

Preferred examples of the inorganic acid may include: hydrochloric acid, sulfuric acid and phosphoric acid, and preferred examples of the organic acid may include: acetic acid, oxalic acid and tartaric acid, respectively, for the coagulant.

Further, examples of the inorganic salt or organic salt suitably used as the coagulant may include electrolytes having mono-, di- or tri-valent cations. The mono-valent cation salts may include: inorganic salts, such as sodium chloride, potassium chloride, sodium sulfate and sodium carbonate, and organic salts, such as sodium acetate, potassium acetate, sodium oxalate and sodium tartarate. The divalent cation salts may include: calcium chloride, magnesium chloride, and magnesium sulfate; and organic salts, such as calcium acetate and magnesium acetate. Further, the trivalent cation salts may include: aluminum sulfate, etc.

The species and amount of such a coagulant may be appropriately selected so as to effect the partial or moderate coagulation providing a coagulated polymer percentage of 70–98 wt. % after the first coagulation step.

The following description may be relied on only as rough standard for selection of the species and amount of the coagulant while they can vary also depending on a slurry concentration and a coagulation temperature described hereinafter.

1) In case where the coagulant is an inorganic acid or organic acid, a pH of 2.0–4.5, in the coagulation system after mixing of the polymer latex and the coagulant aqueous solution.
2) In case where the coagulant is a mixture of an inorganic acid or organic acid and an inorganic salt or organic salt, a higher pH is desirable during the coagulation, that is 3.0–6.0.
3) In case where the coagulant is an inorganic salt or organic salt having a mono-, di- or tri-valent cation, the concentration of the salt in the coagulation system is 0.08–0.5 mol/l, for the monovalent cation; 0.005–0.05 mol/l, for the divalent cation; and 0.0008–0.005 mol/l, for the trivalent cation.

Whether the coagulant should be an inorganic acid or organic acid, or an inorganic salt or organic salt, is determined principally depending on the species of emulsifier used in production of the multilayer polymer latex. More specifically, in case where a carboxylic acid-type emulsifier has been used for production of the latex, it is preferred to use an inorganic acid or organic acid as the coagulant and, in case where a sulfonic acid-type or nonionic-type emulsifier has been used for production of the latex, it is preferred to use an inorganic salt or organic salt as the coagulant.

The multilayer polymer latex and the coagulant aqueous solution may preferably be blended in such a ratio as to provide a slurry concentration of 5–20% after the coagulation in order to smoothly perform the coagulation for granulation.

At too low a slurry concentration of below 5 wt. %, the formation of spherical particles may become insufficient to provide a powdery product having a broad particle size distribution including much fine powder fraction. On the other hand, at a concentration in excess of 20 wt. %, an excessive increase in viscosity of the coagulation system is liable to occur, thus making it difficult to obtain a uniform stirring state and resulting in an undesirably broad particle size distribution.

The temperature for coagulation may be determined in view of the objective particle size and particle size distribution and may preferably be selected in a range of 20–100° C. Below 20° C., it becomes difficult to effect cooling with ordinary industrial water and a special cooling apparatus becomes necessary. Even at a temperature exceeding 100° C., the coagulation can be effected by using a pressurized coagulation system, which however requires a special facility and also a larger energy cost. Accordingly, the coagulation temperature should desirably be not exceeding 100° C., and more preferably in a range of 30–85° C.

The coagulation temperature can depend on the coagulant concentration and the stirring condition but may most remarkably be affected by the properties of the multilayer polymer in the latex. Accordingly, in order to smoothly effect the moderate coagulation, it is important for the multilayer polymer in the latex satisfies the above-mentioned appropriate layer structure. Generally describing about the relationship between the coagulation temperature and the multilayer polymer structure or the polymer Tg's forming the respective layers, a lower coagulation temperature is used at lower Tg of the polymers (S) and (H).

A lower coagulation temperature is also used at a larger content of the polymer (S), and as the location of the polymer (S) approaches the surface of the multilayer polymer. In order to determine an optimum coagulation temperature for a latex of multilayer polymer having a certain layer structure, it is desirable to perform a preliminary test by using a temporarily set coagulation temperature which may be lower by 20° C. than Tg of a polymer (H) if the polymer (H) forms the outermost layer of the latex polymer particles or higher by 20° C. than Tg of a polymer (S) if the polymer (S) forms the outermost layer. Based on a coagulated particle size measured as a result of the preliminary test, a coagulation temperature adjustment may preferably be performed such that a higher coagulation temperature may be used when the measured particle size is smaller than the objective particle size, and a lower coagulation temperature may be used when the measured particle size is larger than the objective particle size.

Incidentally, the particle size and its distribution of a product powder polymer finally obtained after drying are substantially determined by those of the polymer particles in the slurry after the moderate coagulation step. Accordingly, the moderate coagulation conditions including the coagulation temperature may preferably be determined based on the results of, e.g., preliminary tests as mentioned above so as to provide an average particle size (=$d_{50}$, described later) in a range of 80–500 μm, more preferably 100–300 μm; and a particle size dispersion factor (=$d_{50}/d_{84}$, described later) in a range of 1.3–2.1, more preferably 1.4–1.9, with respect to a finally obtained powdery polymer product. It is further preferred that the coagulation conditions are set so as to provide a powdery polymer product which is substantially free from particles having a particle size exceeding 850 μm, contains at most 2 wt. %, more preferably at most 1 wt. %, if any, of particles having a particle size below 45 μm, and has a bulk density of at least 0.34 g/cm$^3$ and a blocking strength of at most 1.0 kg.

After the moderate coagulation, it is necessary to effect a second-step coagulation by using an additional coagulant to complete the coagulation. An appropriate amount of coagulant used in the second coagulation step can be determined from a state of completely dissipating the yet-uncoagulated polymer latex. The coagulant used in the second-step coagulation for completely coagulating the yet-uncoagulated polymer latex need not be identical to the one used in the moderate coagulation step, but another species coagulant can be used if it provides a stronger coagulation condition than the moderate coagulation to complete the coagulation.

After completion of the particle formation by dissipating the yet-uncoagulated latex, it is possible to neutralize the slurry, as desired, by adding an acid, such as hydrochloric acid, or by adding an alkali, such as sodium hydroxide, as the case may be. It is also possible to add, e.g., some agents for providing the powder properties of the coagulated particulate product at any stage during the coagulation process. It is preferred to apply a heat treatment to the slurry after the coagulation in order to enhance the coagulation of the coagulated particulate product, thereby increasing the bulk density of the powdery product after drying. The heat treatment temperature may be determined in a range of not causing melt-sticking of the particulate product formed after the coagulation, e.g., in a range of 50–100° C. More specifically, a rough standard may be given as a range of Tg of polymer (H) of the multilayer polymer ±10° C.

The coagulation operation in the present invention may be performed either batchwise or continuously. In the batchwise scheme, all the operations may be performed in a single coagulation vessel, or the slurry after completion of the coagulation may be transferred to another stirring vessel where subsequent operations, such as the neutralization and the heat-treatment may be performed. Further, the continuous scheme operation may be effected in a plurality of stirring vessels disposed in series so that the moderate coagulation is performed in the first vessel, the second vessel is used for completing the coagulation, and the third and subsequent vessels may be used for the neutralization, the heat-treatment, etc. The slurry after the heat-treatment may be subjected to ordinary post-treatments, such as dewatering and drying, to recover a powdery polymer product.

EXAMPLES

Hereinbelow, the present invention will be described more specifically with reference to Examples and Comparative Examples, which however should not be construed to restrict the scope of the present invention in any way. Some physical properties disclosed in Examples were measured according to the following methods.

(1) Average Particle Size (Diameter) of Latex Particles.

Measured by using a sub-micron particle size analyzer ("Coulter Counter N4SD", available from Coulter Electronics Inc.).

(2) Average Particle Size of Powdery Polymer.

20 g of a powdery sample mixed with 0.2 g of carbon black for static electricity prevention is placed on a stacked series of standard sieves according to JIS Z8801 including sieves having mesh openings of 850 μm, 500 μm, 355 μm, 300 μm, 250 μm, 212 μm, 150 μm, 106 μm and 45 μm stacked in this order from the top to the bottom, followed by application of external electromagnetic vibration for 10 min., to measure the amounts of powder on the respective sieves.

From the amounts of the powder on the respective sieves, a cumulative particle size distribution curve (cumulative amount vs. mesh opening) is drawn, and a particle size giving a cumulative amount of 50 wt. % on the curve is taken as the average particle size $d_{50}$ (μm).

Further, a particle size (=$d_{84}$ μm) giving a cumulative amount of 84 wt. % as counted from a large particle size side to a small particle size side is taken on the distributions curve to calculate a particle size distribution factor $d_{50}/d_{84}$ as a measure of particle size distribution factor. A smaller $d_{50}/d_{84}$ value represents a narrower particle size distribution.

(3) Weight-average Molecular Weight (Mw) of a (Co)polymer.

0.05 g of a (co)polymer sample is dissolved in 5 cc of tetrahydrofuran, and the resultant sample solution is subjected to gel permeation chromatography (by using an apparatus system ("LC-6A", made by Shimadzu Seisakusho K. K.) equipped with a column ("SHODEX KF-806L", made by Showa Denko K. K.), thereby obtaining a weight-average molecular weight (Mw) based on polystyrene standard examples.

(4) Bulk Density of Powdery Polymer.

Measured by using a bulk specific gravity meter according to JIS-K6721.

(5) Dusting

During the bulk density measurement, the state of falling-down of a powdery sample is observed with eyes and rated into the following ranks:

A: Free from dusting,
B: Slight dusting,
C: Conspicuous dusting.

(6) Anti-blocking Property (Blocking Strength)

0.5 g of a powder polymer is placed in a tablet molding machine and molded into a tablet of 1 cm$^2$ in sectional area under application of a pressure of 1.96 MPa for 2 hours in a thermostat vessel regulated at 35° C. Then, gradually increasing loads are applied to the tablet sample by a hardness meter (of Kiya-type) to measure a blocking strength (a minimum load (in Kg) required for breaking the tablet). The results may be evaluated based on the measured blocking strengths roughly as follows:

0–1 Kg: Excellent anti-blocking property.
1–2 Kg: Slightly inferior anti-blocking property.
Above 2 Kg: Much inferior anti-blocking property.

Example 1

(Production of Multilayer Polymer Latex)

Into a reaction vessel equipped with a stirrer, 0.1 wt. part of tetrasodium pyrophosphate, 0.002 wt. part of ferrous sulfate, 0.003 wt. part of disodium ethylenediaminetetraacetate, 6.5 wt. parts of 15.5%-potassium oleate (K.OL) aqueous solution and 200 wt. parts of deionized water, were charged, and then the system was aerated with nitrogen and heated to 50° C. Into the reaction vessel, Monomer mixture (1) of 36 wt. parts of styrene (ST) and 24 wt. parts of butyl acrylate (BA), 1 wt. part of n-octylmercaptan, and 0.36 wt. part each of t-butyl hydroperoxide and sodium formaldehyde sulfoxylate, were added and subjected to 3 hours of emulsion polymerization at 50° C. to obtain a soft copolymer (S) latex (a). (Incidentally, in all Examples and Comparative Examples described herein, each monomer mixture was added together with corresponding amounts (0.6 wt. part each per 100 wt. parts of the monomer mixture) of t-butyl peroxide (TBPO) and sodium formaldehyde sulfoxylate (SFAS) as a polymerization initiator system, and therefore, the description of these components will be omitted hereinafter.)

In the presence of the copolymer latex (a), Monomer mixture (2) of 38 wt. parts of methyl methacrylate (MMA) and 2 wt. parts of butyl acrylate (BA) (together with corresponding amounts of TBPO and SFAS) was added and subjected to 3 hours of second-layer emulsion polymerization at 50° C. to obtain a soft/hard (S/H) copolymer latex (b).

Incidentally, Monomer mixture (1) provided a copolymer having Mw=3×10$^4$, and Monomer mixture (2) provided a copolymer having Mw=3×10$^5$, respectively, when polymerized separately.

The composition of the respective monomer mixtures and the resultant multilayer polymer are summarized in Table 1 together with those of Examples and Comparative Examples described hereinafter.

(Coagulation of Copolymer Latex (b))

Into a coagulation vessel equipped with a stirrer, 600 wt. parts of 0.1%-hydrochloric acid aqueous solution (Coagulant (I)) was charged and heated to 80° C. Then, 314 wt. parts (100 wt. parts as resin) of the above-prepared S/H copolymer latex (b) was charged to the vessel, to effect moderate coagulation. (Incidentally, the coagulation temperature of 80° C. was determined through a preliminary test so as to provide a particle size of 100–200 μm with respect to a powdery product recovered after the coagulation, similarly as in Examples described hereinafter.)

The coagulation percentage (%), i.e., coagulated polymer percentage, at this time, was 90% as shown in Table 3 together with those of (Comparative) Examples described hereafter.

Then, 100 wt. parts of 2%-hydrochloric acid aqueous solution (Coagulant (II)) was added to the coagulation vessel to complete the coagulation. After the coagulation, the system was neutralized with sodium hydroxide, and the resultant slurry was heated to 90° C. for heat treatment. The thus-treated slurry was then subjected to filtration, washing with water, de-watering and drying to recover Powder polymer (A).

Some representative properties of Powdery polymer (A) thus obtained and some representative coagulation conditions are summarized in Table 3 together with those of the following (Comparative) Examples (some of which are shown in Table 4).

Example 2

(Production of Multilayer Polymer Latex)

Emulsion polymerization was performed first in two steps similarly as in Example 1 except that the emulsifier was changed to 5 wt. parts of 20%-sodium laurylsulfate (NaLS) aqueous solution, Monomer mixture (1) was changed to a mixture of 18 wt. parts of methyl methacrylate (MMA) and 2 wt. parts of styrene (ST), Monomer mixture (2) was changed to a mixture of 30 wt. parts of styrene (ST) and 20 wt. parts of butyl acrylate (BA), and the n-octylmercaptan was omitted.

In the resultant copolymer latex, Monomer mixture (3) of 22.5 wt. parts of styrene (ST) and 7.5 wt. parts of acrylonitrile (AN) (together with corresponding amounts of TBPO and SFAS) was added to effect 3 hours of third-layer emulsion polymerization at 50° C. to obtain an H/S/H copolymer latex (c).

(Coagulation)

The copolymer latex (c) was then subjected to two steps of coagulation in a similar manner as in Example 1 but under different conditions as shown in Table 3, and the resultant slurry was subjected to similar post treatments as in Example 1 except for omitting the neutralization to obtain Powdery polymer (B).

As shown in Table 3, Powdery polymers (A) and (B) prepared in the above Examples 1 and 2 respectively exhibited a narrow particle size distribution with extremely little fine powder fraction and an excellent anti-blocking property.

Comparative Examples 1 and 2

The copolymer latex (c) prepared in Example 2 was coagulated in similar manners as in Example 2 but two different first-step moderate coagulation conditions shown in Table 3, i.e., at a lower coagulant concentration (Comparative Example 1) and a higher coagulant concentration (Comparative Example 2), thereby obtaining Powder polymers (C) and (D), respectively. The properties of these products are shown in Table 3.

As is understood from Table 3, Powdery polymer (C) exhibited a poor particle size distribution including much coarse powder fraction and fine powder fraction because a large amount of yet-uncoagulated polymer remained after the first-step coagulation and was abruptly coagulated by addition of further coagulant in the second coagulation step. On the other hand, Powdery polymer (D) included an excessively large amount of coarse powder fraction ($\geq 850$ μm). These results show that the control of coagulated polymer percentage in the first coagulation step in an appropriate range is essential for providing a powdery polymer having an excellent particle size distribution.

Example 3

Three-step emulsion polymerization was performed in the same manner as in Example 2 except that the emulsifier was changed to 5 wt. parts of 30%-sodium N-lauroylsarcocinate (NaNLS) and Monomer mixtures (1)–(3) for the respective layers were changed as shown in Table 2, thereby obtaining an S/H/S copolymer latex (d). Incidentally, Monomer mixtures (1) and (3) provided copolymers of Mw$\leq 5\times 10^4$, and Monomer mixture (2) provided a copolymer of Mw$\geq 3\times 10^5$, respectively, when polymerized separately.

The copolymer latex (d) was subjected to two-step coagulation in the same manner as in Example 2 except for changing the coagulation conditions including the species and concentration of the coagulant in the first coagulation step as shown in Table 3, to finally obtain Powdery polymer (E).

Comparative Example 3

Two-step emulsion polymerization was performed in the same manner as in Example 1 except that the emulsifier was changed to 5 wt. parts of 30%-sodium N-lauroylsarcocinate (NaNLS), Monomer mixtures (1) and (2) were changed as shown in Table 2 and the n-octylmercaptan was omitted to obtain an H/S copolymer latex (e). The latex was then subjected to two-step coagulation in the same manner as in Example 1 except that the coagulation conditions were changed as shown in Table 3 including the coagulant, and the slurry was post-treated in the same manner as in Example 1 except for a lower heat-treatment temperature of 80° C., thereby obtaining Powdery polymer (F).

Powder polymer (F) contained a substantial proportion of coarsely large particles ($\geq 850$ μm) due to a large proportion of S-polymer in the outermost layer. Further, as it was impossible to impart a sufficiently high heat-treatment temperature, Powdery polymer (F) also exhibited a lower bulk density and inferior anti-blocking property.

Example 4 and Comparative Examples 4–6

Copolymer latexes (f)–(i) were prepared in the same manner as in Example 2 except that Monomer mixtures (1)–(3) were respectively changed as shown in Table 2, and each of Monomer mixtures (1) and (3) was used after being mixed with 1.7 wt. parts of n-octylmercaptan per 100 wt. parts thereof. Incidentally, for each of copolymer latexes (f)–(i), Monomer mixtures (1) and (3) provided a copolymer of Mw$\leq 5\times 10^4$, and Monomer mixture (2) provided a copolymer of Mw$\geq 3\times 10^5$, respectively, when polymerized separately.

These latexes (f)–(i) were respectively subjected to two-step coagulation and post-treatments in the same manner as in Example 2 except for changing the coagulation conditions as shown in Table 4 and changing the heat-treatment temperatures to 60° C., 80° C. and 80° C. for Comparative Examples 4, 5 and 6, respectively, thereby obtaining Powdery polymers (G)–(J) (Example 4 and Comparative Examples 4–6).

Powdery polymers (H) and (I) prepared in Comparative Examples 4 and 5 obtained from multilayer polymers having a large amount of S-polymer in the outermost layer similarly as in Comparative Example 3 contained substantial amounts of coarsely large particles ($\geq 850$ μm), due to inadequacy of the first-step coagulation conditions.

Reference Example

Three-step emulsion polymerization was performed in the same manner as in Example 2 except that Monomers (1) to (3) were changed as shown in Table 2, i.e., so as to have identical compositions (MMA/BA=3/1) each providing an H-polymer (of Tg=47° C.) to obtain a copolymer latex (j) of a multilayer polymer including three layers of identical composition. The latex (j) was then subjected to two-step coagulation and post-treatment in the same manner as in Example 2 except for changing the coagulation conditions as shown in Table 4 and the heat-treatment temperature to 65° C., to obtain Powdery polymer (K). In the case of such a latex polymer having a uniform composition structure, the latex polymer particles were softened entirely by the heating for coagulation, thus resulting in coarse particles if it was tried to obtain an objective average particle size. Further, at a high heat-treatment temperature, coarsely large particles were further formed to cause blocking, so that it was impossible to impart a sufficiently high heat-treatment temperature. As a result, Powdery polymer (K) exhibited a low bulk density while it contained a large proportion of coarse particles (>850 μm), and also finally contained a large proportion of fine particles (<45 μm) due to fragile particles thereof.

The above-mentioned powder properties of the powdery polymers obtained in the above-described Examples and Comparative Examples are inclusively shown in Tables 3 and 4.

TABLE 1

| | Multilayer polymer composition ((H/)/S/H) | | | |
| --- | --- | --- | --- | --- |
| | | Monomer mixture *1 | | H//S//H*3 |
| Example | | (1) | (2) | (3) | wt. parts |
| Ex. 1 | Composition | ST/BA | MMA/BA | | 0//60//40 |
| | wt. parts | 36/24 | 38/2 | | |
| | Tg (° C.)*2 | 20 | 92 | | |
| Ex. 2 & | Composition | MMA/ST | ST/BA | ST/AN | 20//50//30 |
| Comp. Ex. | wt. parts | 18/2 | 30/20 | 22.5/7.5 | |
| 1, 2 | Tg (° C.)*2 | 105 | 20 | 103 | |

Note to Table 1 (as well as Table 2 on the next page)
*1: The following abbreviations are used for expressing respective monomers: MMA = methyl methacrylate, BMA = butyl methacrylate, BA = butyl acrylate, ST = styrene, AN = acrylonitrile.

TABLE 1-continued

| | Multilayer polymer composition ((H/)/S/H) | | | |
|---|---|---|---|---|
| | Monomer mixture *1 | | | H//S//H*3 |
| Example | (1) | (2) | (3) | wt. parts |

*2: Tg: Glass transition temperature obtained by separately polymerizing a monomer mixture for each layer (calculated according to Fox's formula)
*3: Layers forming the multilayer polymer are indicated sequentially from the inside to the outside while using symbols, S for representing a layer of soft polymer (of Tg < 40° C.) and H for representing a layer of hard polymer (of Tg ≧ 40° C.).

TABLE 2

| | | Multilayer polymer composition ((S/)H/S) | | | |
|---|---|---|---|---|---|
| | | Monomer mixture *1 | | | S//H//S *3 |
| Example | | (1) | (2) | (3) | wt. parts |
| Ex. 3 | Composition | ST/BA | MMA/ST | ST/BA | 20//60//20 |
| | wt. parts | 12/8 | 54/6 | 12/8 | |
| | Tg(° C.) *2 | 20 | 105 | 20 | |
| Comp. Ex. 3 | Composition | MMA/BA | MMA/BMA/BA | | 0//50//50 |
| | wt. parts | 45/5 | 20/10/20 | | |
| | Tg(° C.) *2 | 79 | 7 | | |

TABLE 2-continued

| | | Multilayer polymer composition ((S/)H/S) | | | |
|---|---|---|---|---|---|
| | | Monomer mixture *1 | | | S//H//S *3 |
| Example | | (1) | (2) | (3) | wt. parts |
| Ex. 4 | Composition | ST/BA | MMA/BA | ST/BA | 60//30//10 |
| | wt. parts | 36/24 | 27/3 | 6/4 | |
| | Tg(° C.) *2 | 20 | 92 | 20 | |
| Comp. Ex. 4 | Composition | ST/BA | MMA/BA | ST/BA | 5//20//75 |
| | wt. parts | 3/2 | 18/2 | 45/30 | |
| | Tg(° C.) *2 | 20 | 92 | 20 | |
| Comp. Ex. 5 | Composition | ST/BA | MMA/BA | ST/BA | 5//45//50 |
| | wt. parts | 3/2 | 40.5/4.5 | 30/20 | |
| | Tg(° C.) *2 | 20 | 92 | 20 | |
| Comp. Ex. 6 | Composition | ST/BA | MMA/BA | ST/BA | 70//20//10 |
| | wt. parts | 42/28 | 18/2 | 6/4 | |
| | Tg(° C.) *2 | 20 | 92 | 20 | |
| Reference Example | Composition | MMA/BA | MMA/BA | MMA/BA | H//H//H 20//40//40 |
| | wt. parts | 15/5 | 30/10 | 30/10 | |
| | Tg(° C.) *2 | 47 | 47 | 47 | |

Notes:
*1, *2 and *3: The same as in Table 1.

TABLE 3

Conditions for Production and Coagulation of Multilayer polymer latexes, and Properties of Powdery polymer products

| | | Example | | | | | |
|---|---|---|---|---|---|---|---|
| | | Ex. 1 | Ex. 2 | Comp. 1 | Comp. 2 | Ex. 3 | Comp. 3 |
| Multilayer polymer latex | | (b) | (c) | (c) | (c) | (d) | (e) |
| (Layer structure) | | (S/H) | (H/S/H) | (H/S/H) | (H/S/H) | (S/H/S) | (H/S) |
| Emulsifier *1 | | K.OL | NaLS | → | → | NaNLS | → |
| Latex particle size (nm) | | 160 nm | 140 | → | → | 210 | → |
| Coagulation conditions | | | | | | | |
| 1st. Step | coagulant (I) | HCl | CaCl₂ | → | → | HCl | HCl |
| | coagulant conc. (wt. %) | 0.10 | 0.22 | 0.05 | 0.30 | 0.40 | 0.45 |
| | Temp(° C.) | 80 | 75 | → | → | 55 | 35 |
| | coagulated polymer (%) | 90 | 92 | 63 | 99 | 85 | 90 |
| 2nd. Step | coagulant (II) | HCl | CaCl₂ | → | → | CaCl₂ | CaCl₂ |
| | coagulant conc. (wt. %) | 2 | 1 | 1 | 1 | 1 | 1 |
| Powdery Polymer | | (A) | (B) | (C) | (D) | (E) | (F) |
| Properties | $d_{50}(\mu m)$ | 140 | 135 | 120 | 170 | 140 | 125 |
| | >850 μm(%) | 0 | 0 | 3.8 | 10 | 0 | 3.2 |
| | <45 μm(%) | 0.6 | 0.4 | 8.0 | 5.1 | 0.3 | 3.5 |
| | $d_{50}/d_{84}(-)$ | 1.5 | 1.5 | 2.2 | 2.5 | 1.5 | 1.8 |
| | Dusting | A | A | C | B | A | B |
| | Bulk density(g/cm³) | 0.35 | 0.37 | 0.31 | 0.36 | 0.39 | 0.31 |
| | Blocking strength (kg) | 0.8 | 0.4 | 0.5 | 0.4 | 0.3 | ≧2 |

Notes to Table 3 (as well as Table 4 on the next page)
*1: K.OL = potassium oleate, NaLS = sodium laurylsulfate, NaNLS = sodium N-lauroylsarcocinate
"→" means the same as in the adjacent left column.

TABLE 4

Conditions for Production and Coagulation of Multilayer polymer latexes, and Properties of Powdery polymer products

|  |  | Example | | | | Reference |
|---|---|---|---|---|---|---|
|  |  | Ex. 4 | Comp. 4 | Comp. 5 | Comp. 6 | Example |
| Multilayer polymer latex |  | (f) | (g) | (h) | (i) | (j) |
| (Layer structure) |  | (S/H/S) | (S/H/S) | (S/H/S) | (S/H/S) | (H) |
| Emulsifier *1 |  | NaLS | → | → | → | → |
| Latex particle size (nm) |  | 145 | → | → | → | → |
| Coagulation conditions |  |  |  |  |  |  |
| 1st. Step | coagulant (I) | $CaCl_2$ | → | → | → | → |
|  | coagulant conc. (wt. %) | 0.28 | 0.32 | 0.31 | 0.29 | 0.32 |
|  | Temp(° C.) | 65 | 30 | 35 | 40 | 55 |
|  | coagulated polymer (%) | 90 | 93 | 92 | 85 | 85 |
| 2nd. Step | coagulant (II) | $CaCl_2$ | → | → | → | → |
|  | coagulant conc. (wt. %) | 1 | → | → | → | → |
| Powdery Polymer |  | (G) | (H) | (I) | (J) | (K) |
| Properties | $d_{50}(\mu m)$ | 125 | 145 | 130 | 142 | 102 |
|  | >850 μm(%) | 0 | 4.5 | 3.7 | 1.5 | 2.2 |
|  | <45 μm(%) | 0.4 | 2.5 | 4.5 | 4.1 | 13.5 |
|  | $d_{50}/d_{84}(-)$ | 1.5 | 1.9 | 1.9 | 1.8 | 2.0 |
|  | Dusting | A | B | B | B | C |
|  | Bulk density(g/cm³) | 0.39 | 0.31 | 0.33 | 0.37 | 0.29 |
|  | Blocking strength (kg) | 0.8 | ≧2 | ≧2 | ≧2 | 1.3 |

Notes:
*1 and "→" are the same as in Table 3.

INDUSTRIAL APPLICABILITY

As is clear in view of the results shown in Tables 1 to 4, according to the process of the present invention, wherein a latex of multilayer polymer having a specific layer structure is subjected a two-step coagulation process including a first moderate coagulation step, it becomes possible to smoothly proceed with moderate coagulation of a latex of a linear polymer containing a large proportion of soft polymer, thereby providing a powdery polymer product which contains little fine powder fraction liable to cause dusting, has a narrow particle size distribution and is excellent in anti-blocking property.

The invention claimed is:

1. A process for producing a powdery linear polymer, comprising: a step of forming a latex (A) of a multilayer polymer having a multilayer structure comprising a linear polymer (S) having a glass transition temperature below 40.degree. C. and a linear polymer (H) having a higher glass transition temperature disposed in totally at least two layers and containing 35–75 wt. %, as a whole, of the linear polymer (S) with the proviso that the linear polymer (S) cannot be contained in excess of 30 wt. % in an outermost layer of the multilayer structure, a moderate coagulation step of adding a coagulant to the latex (A) to coagulate 70–98 wt. % of the multilayer polymer, and a further coagulation step of further adding a coagulant to the latex to complete the coagulation of the multilayer polymer.

2. A process according to claim 1, wherein the latex (A) is produced through a process including the steps of: (a) in the presence of 0–60 wt. parts of a linear polymer (H1) having a glass transition temperature of at least 40.degree. C., polymerizing a monomer mixture which, when polymerized alone, provides a glass transition temperature below 40.degree. C., to form 35–75 wt. parts of a linear polymer (S), and (b) in the presence of the polymers (H1) and (S), further polymerizing a monomer mixture which, when polymerized alone, provides a glass transition temperature of at least 40.degree. C., to form 5–65 wt. parts of a linear polymer (H2) so as to provide 100 wt. parts in total of (H1)+(S)+(H2).

3. A process according to claim 1, wherein the latex (A) is produced through a process including the steps of: (a) in the presence of 5–75 wt. parts of a linear polymer (S1) having a glass transition temperature below 40.degree. C., polymerizing a monomer mixture which, when polymerized alone, provides a glass transition temperature of at least 40.degree. C., to form 25–65 wt. parts of a linear polymer (H), and (b) in the presence of the polymers (S1) and (H), further polymerizing a monomer mixture which, when polymerized alone, provides a glass transition temperature below 40.degree. C., to form 0–30 wt. parts of a linear polymer (S2) so as to provide 100 wt. parts in total of (S1)+(H)+(S2).

4. A process according to claim 1, wherein the linear polymer (S) has a glass transition temperature of −80.degree. C. to 35.degree. C., and the linear polymer (H) has a glass transition temperature which is higher by at least 30.degree. C. than that of the linear polymer (S).

5. A process according to claim 1, wherein the linear polymer (S) having a glass transition temperature (Tg) below 40.degree. C. is a (co)polymer having a weight-average molecular weight of at most 100,000 obtained by polymerizing a monomer (mixture) comprising 25–100 wt. % of at least one species of monomer selected from alkyl acrylates an alkyl group of 1–18 carbon atoms, and at least one species of monomer selected from other vinyl monomers copolymerizable with an alkyl acrylate; and the linear polymer (H) having a glass transition temperature (Tg) of at least 40.degree. C. is a (co)polymer having a weight-average molecular weight of at least 100,000 obtained by polymerizing a monomer (mixture) comprising 35–100 wt. % of at least one species of monomer selected from methacrylate esters, acrylate esters and styrenic monomers, and 0–65 wt. % of at least one species of monomer selected from other vinyl monomers copolymerizable therewith.

6. A process according to claim 5, wherein the linear polymer (S) has a weight-average molecular weight of at most $5 \times 10^4$, and the linear polymer (H) has a weight-average molecular weight of at least $3 \times 10^5$.

7. A process according to claim 1, further including a step of heat-treating the coagulated multilayer polymer at a temperature which is in a range of $\pm 10^\circ$ C. with respect to the glass transition temperature of the linear polymer (H).

8. A powdery linear polymer obtainable through a process according to claim 1, wherein the powdery linear polymer has a multilayer structure comprising a linear polymer (S) having a glass transition temperature below $40^\circ$ C. and a linear polymer (H) having a higher glass transition temperature disposed in totally at least two layers and containing 35–75 wt. %, as a whole, of the linear polymer (S) with the proviso that the linear polymer (S) cannot be contained in excess of 30 wt. % in an outermost layer of the multilayer structure, and the powdery linear polymer has powder properties including an average particle size $d_{50}$ in a range of 80–500 $\mu m$ and a particle size distribution factor $d_{50}/d_{84}$ in a range of 1.3–2.1, wherein $d_{50}$ and $d_{84}$ are particle sizes giving cumulatively 50 wt. % and 80 wt. %, respectively, of particles counted from a larger particle size side to a smaller particle size side on a particle size distribution curve.

9. A powdery linear polymer according to claim 8, which is substantially free from particles larger than 850 $\mu m$ and contains less than 2 wt. % of particles smaller than 45 $\mu m$.

10. A powdery linear polymer according to claim 8, which has a bulk density of at least 0.34 $g/cm^3$.

11. A powdery linear polymer according to claim 8, which exhibits a blocking strength of at most 1.0 kg.

* * * * *